US012633476B2

(12) United States Patent
Yoshida et al.

(10) Patent No.: US 12,633,476 B2
(45) Date of Patent: May 19, 2026

(54) LIMIT SWITCH

(71) Applicant: OMRON Corporation, Kyoto (JP)

(72) Inventors: Kouhei Yoshida, Kyoto (JP); Kazuyuki Tsukimori, Kyoto (JP); Sho Ogawa, Kyoto (JP); Mamoru Ito, Okayama (JP); Masato Matoba, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 466 days.

(21) Appl. No.: 18/273,691

(22) PCT Filed: Mar. 11, 2021

(86) PCT No.: PCT/JP2021/009907

§ 371 (c)(1),
(2) Date: Jul. 21, 2023

(87) PCT Pub. No.: WO2022/172474

PCT Pub. Date: Aug. 18, 2022

(65) Prior Publication Data

US 2024/0105406 A1 Mar. 28, 2024

(30) Foreign Application Priority Data

Feb. 12, 2021 (JP) ................................ 2021-021035

(51) Int. Cl.
*H01H 21/28* (2006.01)

(52) U.S. Cl.
CPC ....... *H01H 21/28* (2013.01); *H01H 2021/287* (2013.01)

(58) Field of Classification Search
CPC .... H01H 21/28; H01H 2021/287; H01H 3/16; H01H 21/285; H01H 13/18; H01H 19/18;
(Continued)

(56) References Cited

U.S. PATENT DOCUMENTS

2014/0360849 A1* 12/2014 Takahashi ............ H01H 21/285 29/622
2014/0374224 A1* 12/2014 Takahashi .............. H01H 69/01 200/47

(Continued)

FOREIGN PATENT DOCUMENTS

JP S56106319 A 8/1981
JP 2015204223 A 11/2015
JP 2019160630 A 9/2019

OTHER PUBLICATIONS

International Search Report for International Application No. PCT/JP2021/009907; Mailing Date, May 18, 2021.

(Continued)

*Primary Examiner* — Ahmed M Saeed
(74) *Attorney, Agent, or Firm* — CANTOR COLBURN LLP

(57) ABSTRACT

A limit switch includes: a switch main body capable of being switched on and off; and an operation unit connected to the switch main body. The operation unit includes: a housing having a box shape; a shaft portion including a shaft main body and a cam portion, the shaft main body being supported by the housing in a state of being rotatable forward from a return position toward a first operation position around a rotation axis extending in the first direction and being rotatable backward from the return position toward a second operation position opposite to the first operation position with respect to the return position, the cam portion being provided in the shaft main body located inside the housing and being configured to rotate forward and backward together with the shaft main body; a biasing portion configured to return the shaft main body to the return position; and a plunger configured to move in the second direction by rotation of the cam portion to switch on and off of the switch main body, and configured to be able to set an (Continued)

operation mode from either one-side operation or both-side operation.

12 Claims, 8 Drawing Sheets

(58) Field of Classification Search
CPC ...... H01H 19/62; H01H 13/186; H01H 21/34; H01H 3/42; H01H 35/12; H01H 11/0006; H01H 19/183
See application file for complete search history.

(56) References Cited

U.S. PATENT DOCUMENTS

| | | | | |
|---|---|---|---|---|
| 2015/0114805 | A1* | 4/2015 | Tsukimori ............ | H01H 21/285 200/47 |
| 2015/0213977 | A1* | 7/2015 | Yamamoto ........... | H01H 21/285 200/47 |
| 2016/0189894 | A1* | 6/2016 | Tsukimori .............. | H01H 21/28 200/47 |

OTHER PUBLICATIONS

PCT Written Opinion of the International Searching Authority for International Application No. PCT/JP2021/009907, Date of Mailing, May 18, 2021.

* cited by examiner

LIMIT SWITCH

CROSS REFERENCE TO RELATED APPLICATIONS

This is the U.S. national stage of application No. PCT/JP2021/009907, filed on Mar. 11, 2021. Priority under 35 U.S.C. § 119(a) and 35 U.S.C. § 365(b) is claimed from Japanese Application No. 2021-021035, filed Feb. 12, 2021, the disclosure of which is also incorporated herein by reference.

TECHNICAL FIELD

The present disclosure relates to a limit switch.

BACKGROUND ART

Patent Document 1 discloses a limit switch including a housing in which a built-in switch is accommodated. The limit switch includes a rotatable shaft and the built-in switch that is switched on and off according to rotation of the shaft and is configured to perform so-called both-side operation such that the built-in switch is switched even when the shaft rotates in either forward or reverse direction.

CITATION LIST

Patent Document

Patent Document 1: JP 2015-204223 A

SUMMARY

Problems to be Solved

In recent years, with diversification of industries, not only limit switches for both-side operation, but also limit switches for so-called one-side operation in which a built-in switch is switched when a shaft rotates in a forward direction, but the built-in switch is not switched when the shaft rotates backward are increasingly demanded.

An object of the present disclosure is to provide a limit switch in which an operation mode can be set from either one-side operation or both-side operation.

Solution to Problems

A limit switch of a first example of the present disclosure includes:

- a switch main body capable of being switched on and off; and
- an operation unit connected to the switch main body, wherein
- the operation unit includes:
  - a housing having a box shape;
  - a shaft portion including a shaft main body and a cam portion, the shaft main body extending from an outside of the housing to an inside of the housing along a first direction and being supported by the housing in a state of being rotatable forward from a return position toward a first operation position around a rotation axis extending in the first direction and being rotatable backward from the return position toward a second operation position opposite to the first operation position with respect to the return position, the cam portion being provided in the shaft main body located inside the housing and being configured to rotate forward and backward together with the shaft main body;
  - a biasing portion that is disposed inside the housing and biases the cam portion in a second direction intersecting the first direction and in a direction approaching the switch main body to return the shaft main body to the return position; and
  - a plunger that is disposed between the switch main body and the cam portion in the second direction inside the housing and is disposed so as to face the cam portion, is configured to move in the second direction by rotation of the cam portion to switch on and off of the switch main body, and is configured to be able to set an operation mode from either one-side operation in which the cam portion is in contact at the first operation position but the cam portion is not in contact at the second operation position, or the cam portion is in contact at the second operation position but the cam portion is not in contact at the first operation position, or both-side operation in which the cam portion is in contact not only at the first operation position but also at the second operation position, the cam portion includes:

- a cam main body in contact with the biasing portion;
- a first protruding portion that protrudes from one side in a third direction intersecting the first direction and the second direction of the cam main body to a radial direction with respect to the rotation axis and a direction away from the cam main body when viewed along the second direction, and is configured to be able to come into contact with the plunger;
- a second protruding portion that protrudes from the other side in the third direction of the cam main body to the radial direction and a direction away from the cam main body, and is configured to be able to come into contact with the plunger;
- a first notch provided at one end of the first protruding portion in the first direction and extending toward the rotation axis from an end of the first protruding portion farther from the rotation axis in the radial direction; and
- a second notch provided at the other end of the second protruding portion in the first direction and extending toward the rotation axis from an end of the second protruding portion farther from the rotation axis in the radial direction, the plunger includes:

- a plunger main body facing the cam portion in the second direction;
- a first contact portion that protrudes from the plunger main body toward the cam portion along the second direction, and is configured to be able to be accommodated in the first notch and to come into contact with the second protruding portion;
- a second contact portion that protrudes from the plunger main body toward the cam portion along the second direction, and is configured to be able to be accommodated in the second notch and to come into contact with the first protruding portion;
- a third contact portion that protrudes from the plunger main body toward the cam portion along the second direction, and is configured to be able to be accommodated in the first notch and to come into contact with the second protruding portion or to be able to be accommodated in the second notch and to come into contact with the first protruding portion; and a non-contact portion configured to be not in contact with the first protruding portion and the second protruding portion, the first contact portion and the second contact portion are disposed so as to face each other in a facing direction intersecting the second direction, and the third contact portion and the non-contact portion are disposed so as to face each other in a direction intersecting the second direction and in a direction different from the facing direction, in a state where the plunger is disposed such that the first contact portion faces the second notch and the first protruding portion, and the second contact portion faces the first notch and the second protruding portion in the second direction, an operation mode is set to the both-side operation, and in a state where the plunger is disposed such that the third contact portion faces the first notch and the second protruding portion, and the non-contact portion faces the second notch and the first protruding portion, or such that the third contact portion faces the second notch and the first protruding portion and the non-contact portion faces the first notch and the second protruding portion in the second direction, the operation mode is set to the one-side operation.

Advantageous Effects of Invention

According to the limit switch, the plunger includes the plunger main body, the first contact portion configured to be able to be accommodated in the first notch and to come into contact with the first protruding portion at the first operation position, the second contact portion configured to be able to be accommodated in the second notch and to come into contact with the second protruding portion at the second operation position, the third contact portion configured to be able to be accommodated in the first notch or the second notch and to come into contact with the first protruding portion at the first operation position or to come into contact with the second protruding portion at the second operation position, and the non-contact portion configured to be not in contact with the first protruding portion and the second protruding portion. The first contact portion and the second contact portion are disposed so as to face each other in the facing direction, and the third contact portion and the non-contact portion are disposed so as to face each other in a direction different from the facing direction. With such a configuration, it is possible to realize the limit switch in which the operation mode can be set from either one-side operation or both-side operation.

DETAILED DESCRIPTION

Hereinafter, an example of the present disclosure will be described with reference to the accompanying drawings. In the following description, terms indicating specific directions or positions (for example, terms including "up," "down," "right," and "left") are used as necessary, but the use of these terms is to facilitate understanding of the present disclosure with reference to the drawings, and the technical scope of the present disclosure is not limited by the meanings of these terms. Further, the following description is merely exemplary in nature and is not intended to limit the present disclosure, an object for application, or a usage. Furthermore, the drawings are schematic, and ratios of dimensions and the like do not necessarily match actual ones.

Figure 1:
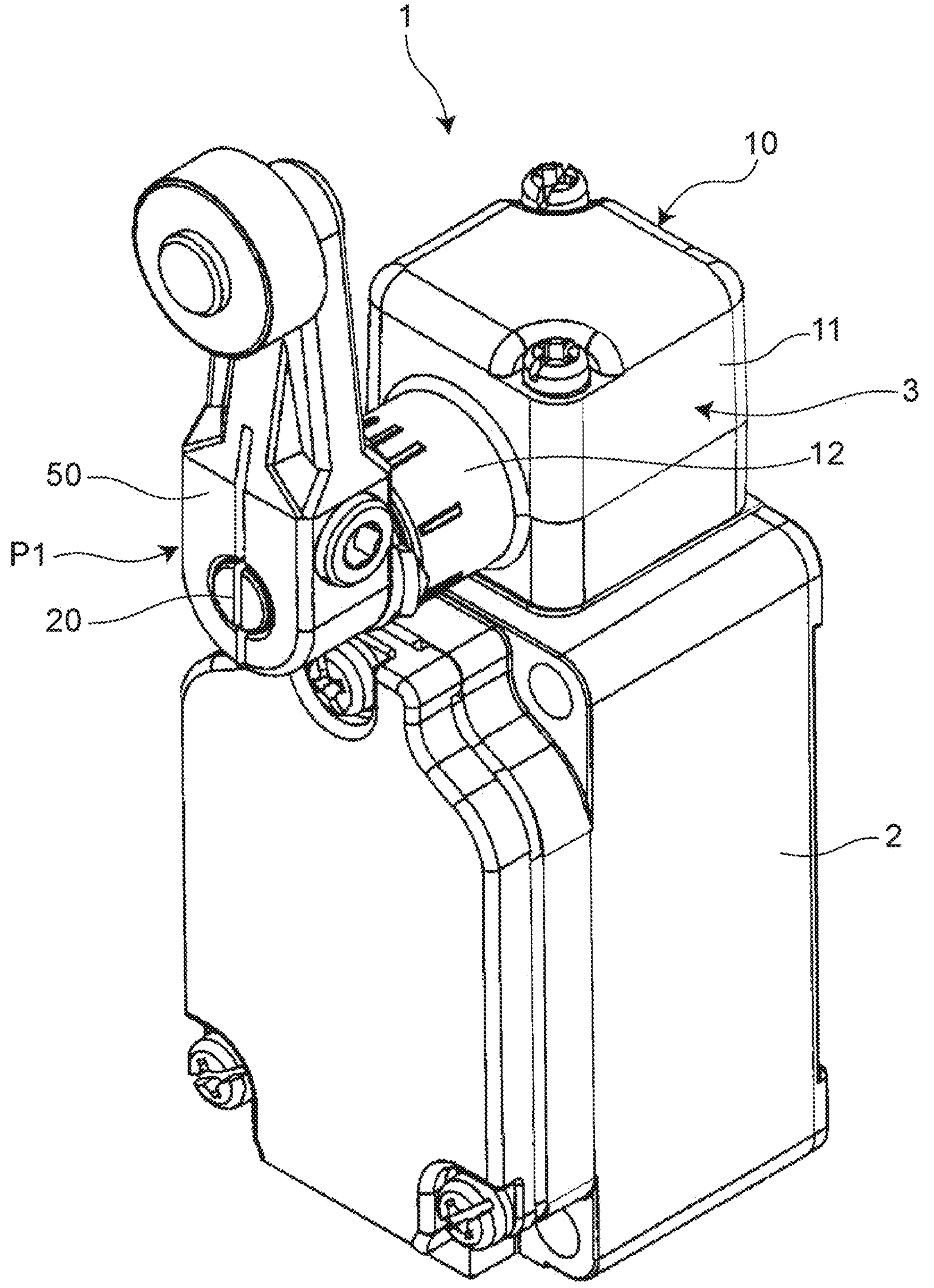
FIG. 1 is a perspective view illustrating a limit switch of an embodiment of the present disclosure.

As illustrated in FIG. 1, a limit switch 1 according to an embodiment of the present disclosure includes a switch main body 2 that can be switched on and off, and an operation unit 3 connected to the switch main body 2.

As illustrated in FIG. 1, the switch main body 2 has a substantially rectangular parallelepiped shape, and the operation unit 3 is detachably connected to one surface of the switch main body 2.

The operation unit 3 includes a housing 10, a shaft portion 20 extending from an outside of the housing 10 to an inside of the housing 10, a biasing portion 30 (see FIG. 3) and a plunger 40 (see FIG. 3) disposed inside the housing 10, and an operation lever 50 connected to the shaft portion 20 outside the housing 10.

Figure 2:
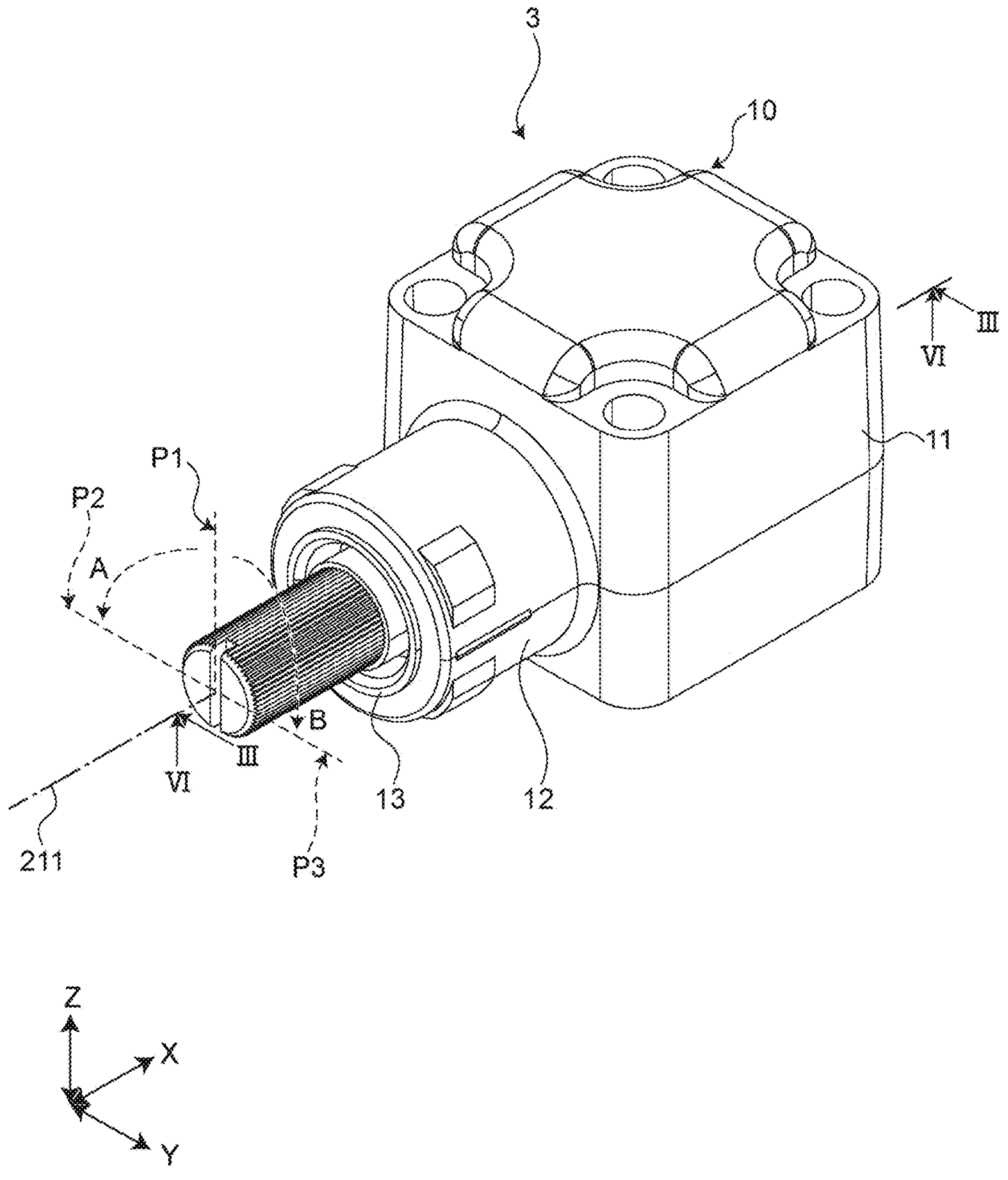
FIG. 2 is a perspective view illustrating an operation unit of the limit switch of FIG. 1.

As illustrated in FIG. 2, the housing 10 includes a hollow housing main body 11, which has a substantially cubic shape, connected to the switch main body 2, and a peripheral wall portion 12 provided on the housing main body 11.

Figure 3:
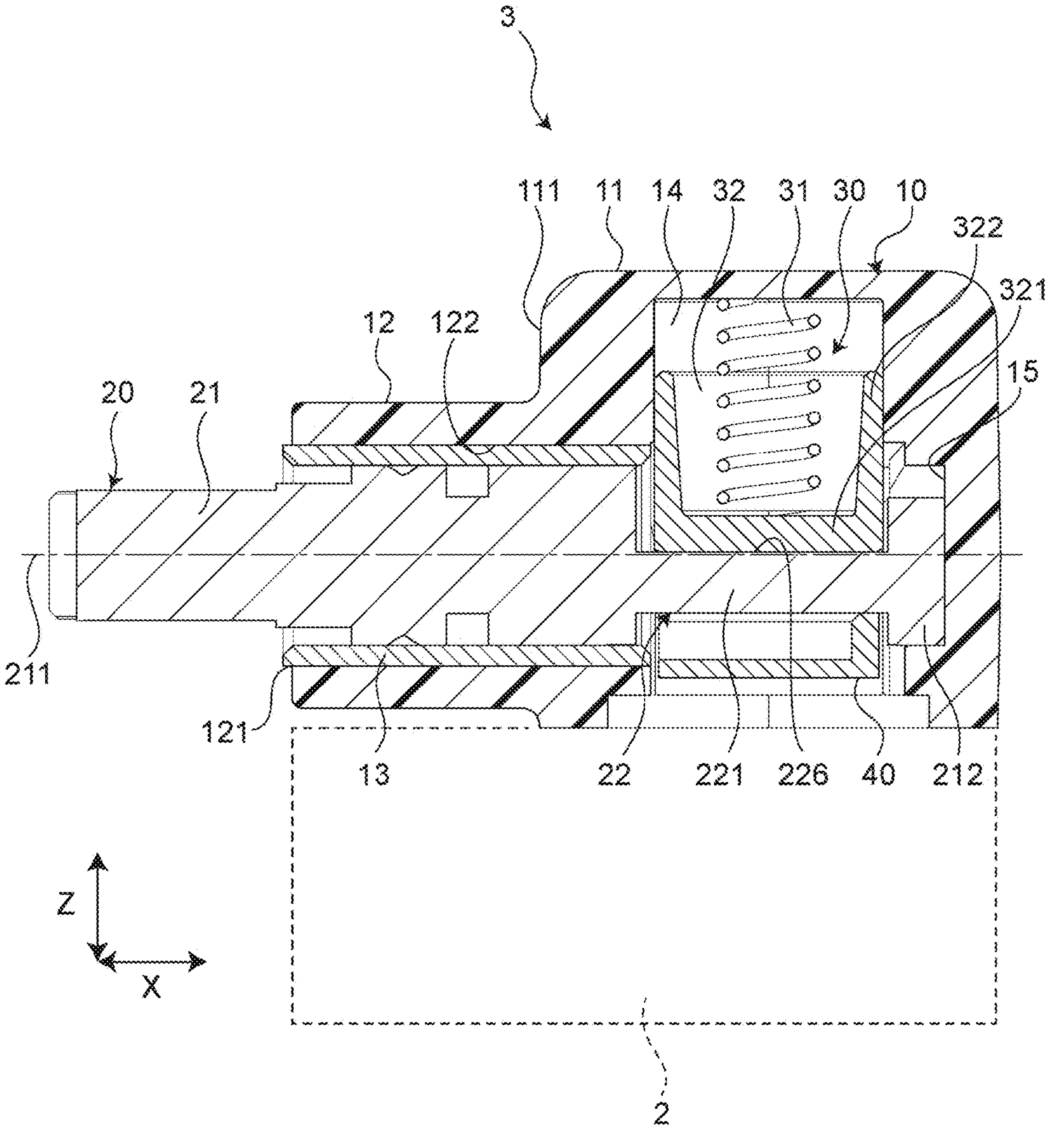
FIG. 3 is a cross-sectional view taken along line of FIG. 2.

The housing main body 11 includes a bearing 13 and an accommodating portion 14 provided therein. As illustrated in FIG. 3, the bearing 13 is disposed in a through hole 122 to be described later and supports the shaft portion 20 so as to be rotatable forward and backward. The accommodating portion 14 houses the biasing portion 30 and the plunger 40.

The peripheral wall portion 12, as an example, has a substantially cylindrical shape, and protrudes from a surface 111 of the housing main body 11 adjacent to a surface connected to the switch main body 2 in a direction intersecting the surface 111 (for example, in the X direction in FIG. 3). The peripheral wall portion 12 includes an opening 121 provided on a surface far from the housing main body 11 in the X direction, and a through hole 122 extending in the X direction inside the peripheral wall portion 12 and connecting the accommodating portion 14 and the opening 121.

As illustrated in FIG. 3, the shaft portion 20 includes a shaft main body 21 and a cam portion 22 that is provided on the shaft main body 21 located inside the housing 10 and rotates forward and backward together with the shaft main body 21.

For example, as illustrated in FIG. 3, the shaft main body 21 has a substantially cylindrical shape extending in a first direction (for example, the X direction), and is supported by the housing 10 in a state of being rotatable forward and backward from a return position P1 around a rotation axis 211. An end portion 212 of the shaft main body 21 located inside the housing 10 is accommodated in a recessed portion 15 provided on the inner wall of the housing 10 constituting the accommodating portion 14. The recessed portion 15 is disposed so as to face the through hole 122 in the first direction X and is recessed from the accommodating portion 14 in the first direction X and in a direction away from the peripheral wall portion 12.

In the present embodiment, as an example, as illustrated in FIG. 2, rotation from the return position P1 toward a first operation position P2 around the rotation axis 211 is defined as forward rotation, and rotation from the return position P1 toward a second operation position P3 opposite to the first operation position P2 with respect to the return position P1 is defined as backward rotation. In FIG. 2, a center line of the operation lever 50 at each position is indicated by a dotted line.

Figure 4:
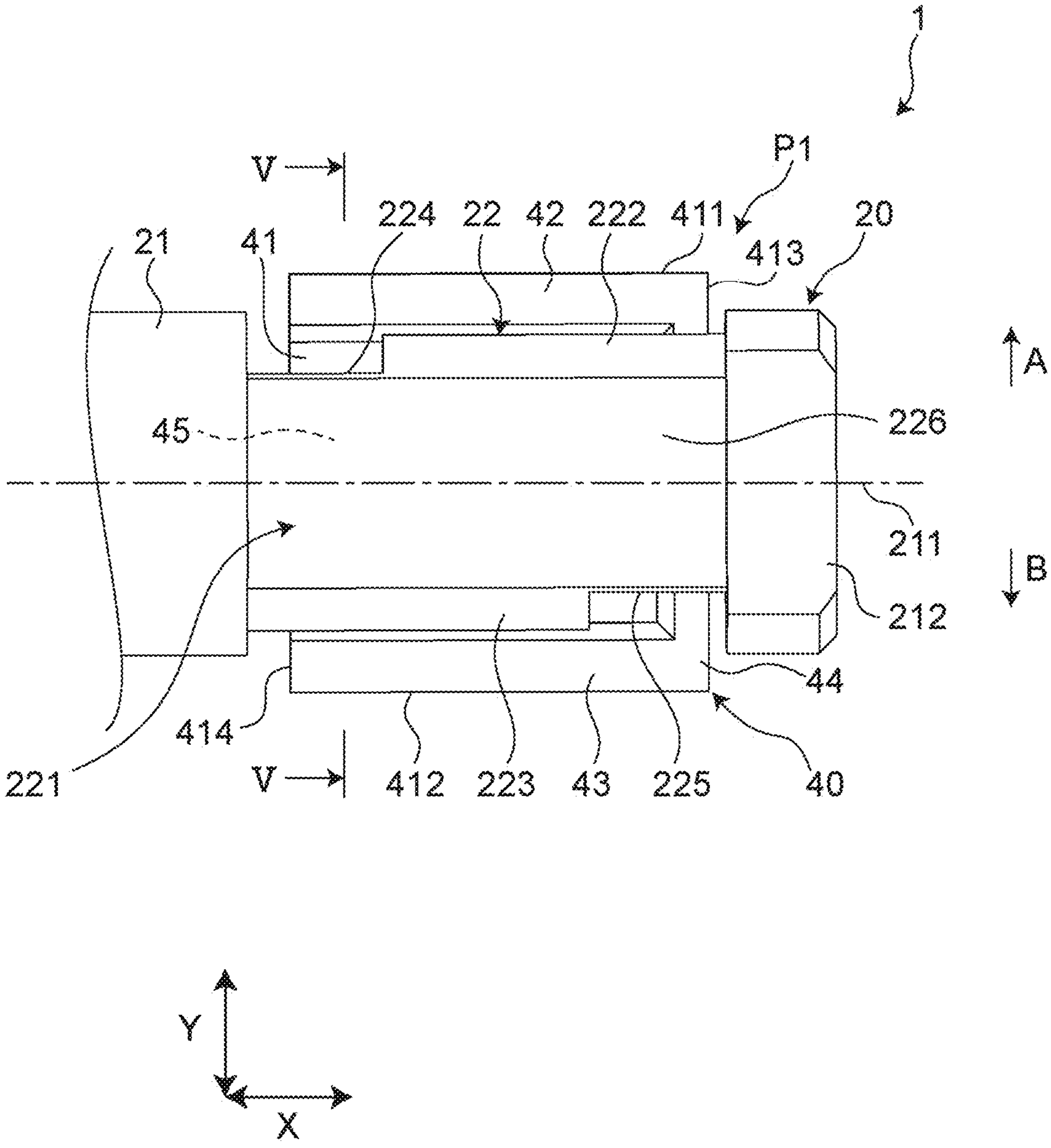
FIG. 4 is a plan view illustrating a cam portion and a plunger of the operation unit of FIG. 2.

As illustrated in FIG. 4, the cam portion 22 includes a cam main body 221, a first protruding portion 222, a second protruding portion 223, a first notch 224, and a second notch 225.

The cam main body 221 is configured such that the biasing portion 30 is in contact with the cam main body. In the present embodiment, as illustrated in FIG. 4, the cam main body 221 has a substantially rectangular plate shape disposed such that the X direction is a longitudinal direction and includes a contact surface 226 extending along the XY plane in a state where the shaft main body 21 is located at the return position P1. The biasing portion 30 comes into contact with the contact surface 226 (see FIG. 3). As illustrated in FIG. 3, when the shaft main body 21 is located at the return position P1, most of the cam main body 221 is disposed closer to the switch main body 2 than the rotation axis 211 in a second direction (for example, the Z direction) intersecting the first direction X.

Figure 5:
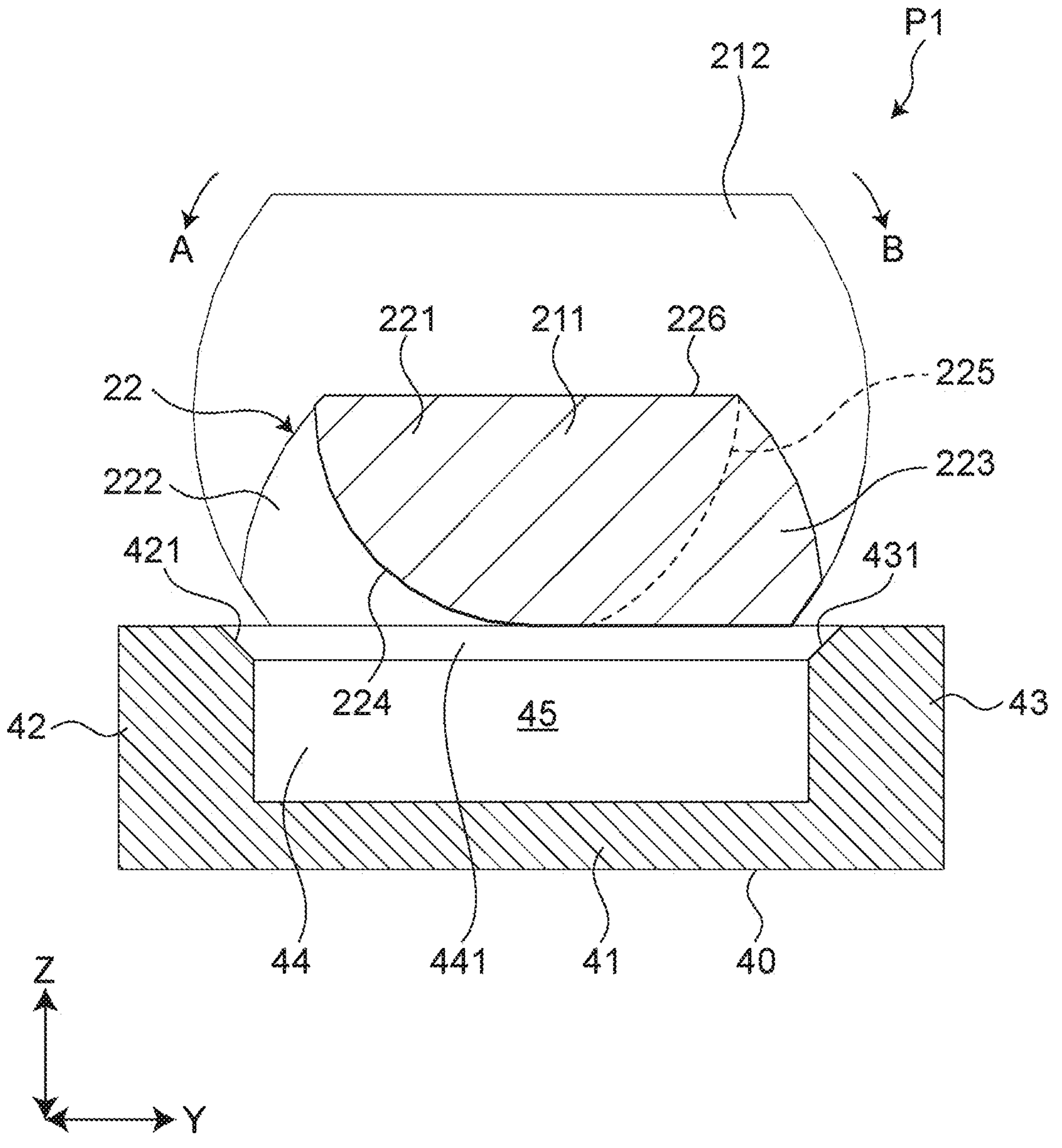
FIG. 5 is a cross-sectional view taken along line V-V of FIG. 4.

As illustrated in FIG. 4, when viewed along the second direction Z, the first protruding portion 222 protrudes from one side in a third direction (for example, the Y direction) intersecting the first direction X and the second direction Z of the cam main body 221 to a radial direction with respect to the rotation axis 211 (hereinafter, it is simply referred to as a radial direction) and a direction away from the cam main body 221, and is configured to be able to come into contact with the plunger 40. In the present embodiment, as illustrated in FIG. 5, the first protruding portion 222 has a tapered shape and protrudes along the radial direction from the cam main body 221 toward a closer end (in FIG. 5, the left end) of both ends of the plunger 40 in the third direction Y.

As illustrated in FIG. 4, the second protruding portion 223 protrudes from the other side of the cam main body 221 in the third direction Y in the radial direction and in the direction away from the cam main body 221 and is configured to be able to come into contact with the plunger 40. In the present embodiment, as illustrated in FIG. 5, the second protruding portion 223 protrudes along the radial direction from the cam main body 221 toward a closer end (in FIG. 5, the right end) of both ends of the plunger 40 in the third direction Y.

As illustrated in FIG. 4, the first notch 224 is provided at one end of the first protruding portion 222 in the first direction X and extends toward the rotation axis 211 from an end of the first protruding portion 222 farther from the rotation axis 211 in the radial direction. In the present embodiment, the first notch 224 is provided at an end of the first protruding portion 222 on a side of the peripheral wall portion 12 in the first direction X. As illustrated in FIG. 4, the second notch 225 is provided at the other end of the second protruding portion 223 in the first direction X and extends toward the rotation axis 211 from an end of the second protruding portion 223 farther from the rotation axis 211 in the radial direction.

As illustrated in FIG. 3, the biasing portion 30 is disposed farther from the switch main body 2 than the cam portion 22 in the second direction Z inside the housing 10. The biasing portion 30 includes a coil spring 31 and a return plunger 32 disposed between the coil spring 31 and the cam portion 22. The coil spring 31 biases the cam portion 22 in the second direction Z and in a direction approaching the switch main body 2 to return the shaft main body 21 to the return position P1. The return plunger 32 includes a transmission plate portion 321 configured to come into contact with the cam main body 221 to transmit biasing force of the coil spring 31 to the cam portion 22, and a guide plate portion 322 configured to guide a movement of the transmission plate portion 321 in the second direction Z.

As illustrated in FIG. 3, the plunger 40 is disposed between the switch main body 2 and the cam portion 22 in the second direction Z inside the housing 10, is disposed so as to face the cam portion 22 and is configured to move in the second direction Z by the rotation of the cam portion 22 to switch on and off of the switch main body 2. In the present embodiment, an operation in which the cam portion 22 comes into contact at the first operation position P2 but the cam portion 22 does not come into contact at the second operation position P3, or an operation in which the cam portion 22 comes into contact at the second operation position P3 but the cam portion 22 does not come into contact at the first operation position P2 is defined as one-side operation. An operation in which the cam portion 22 comes into contact not only at the first operation position P2 but also at the second operation position P3 is defined as both-side operation.

Specifically, as illustrated in FIG. 4 and FIG. 5, the plunger 40 includes a plunger main body 41, a first contact portion 42, a second contact portion 43, a third contact portion 44, and a non-contact portion 45.

As an example, as illustrated in FIG. 4, the plunger main body 41 has a substantially square plate shape, and one surface of the plunger main body 41 in the thickness direction faces the cam portion 22 in the second direction Z.

As illustrated in FIG. 5, the first contact portion 42 protrudes from the plunger main body 41 toward the cam portion 22 along the second direction Z and is configured to be able to be accommodated in the first notch 224 and to come into contact with the first protruding portion 222. As illustrated in FIG. 5, the second contact portion 43 protrudes from the plunger main body 41 toward the cam portion 22 along the second direction Z and is configured to be able to be accommodated in the second notch 225 and to come into contact with the first protruding portion 222. The first contact portion 42 and the second contact portion 43 are disposed so as to face each other in a facing direction (for example, the third direction Y) intersecting the second direction Z.

As illustrated in FIG. 5, the third contact portion 44 protrudes from the plunger main body 41 toward the cam portion 22 along the second direction Z and is configured to be able to be accommodated in the first notch 224 and to come into contact with the second protruding portion 223 or to be able to be accommodated in the second notch 225 and to come into contact with the first protruding portion 222. As illustrated in FIG. 5, the non-contact portion 45 is configured not to come into contact with the first protruding portion 222 or the second protruding portion 223. The third contact portion 44 and the non-contact portion 45 are disposed so as to face each other in a direction intersecting the second direction Z and, in a direction, (for example, the first direction X) different from the facing direction.

For example, in the plunger 40 illustrated in FIGS. 4 and 5, the plunger main body 41 has a quadrangular shape including a first side 411 that is one of sides facing each other in the third direction Y, a second side 412 facing the first side 411 in the third direction Y, a third side 413 intersecting the first side 411 and the second side 412, and a fourth side 414 facing the third side 413. The first contact portion 42 has a substantially rectangular bar shape in cross section and is disposed on the first side 411 of the plunger main body 41. The second contact portion 43 has a substantially rectangular bar shape in cross section and is disposed on the second side 412 of the plunger main body 41. The third contact portion 44 has a substantially rectangular bar shape in cross section and is disposed on the third side 413 of the plunger main body 41, and the non-contact portion 45 is disposed on the fourth side 414 of the plunger main body 41. One longitudinal end of the first contact portion 42 is connected to one longitudinal end of the third contact portion 44, and the other longitudinal end of the second contact portion 43 is connected to the other longitudinal end of the third contact portion 44.

As illustrated in FIG. 4 and FIG. 5, each of the first contact portion 42 and the second contact portion 43 includes an inclined surface 421 and 431 provided at an end in the second direction Z and away from the plunger main body 41 on a surface facing each other. The inclined surfaces 421 and 431 are inclined in directions away from each other with increasing distance from the plunger main body 41 in the second direction Z. As illustrated in FIGS. 4 and 5, the third contact portion 44 has an inclined surface 441 continuous with the inclined surfaces 421 and 431 of the first contact portion 42 and the second contact portion. As illustrated in FIG. 5, the non-contact portion 45 includes a recessed portion surrounded by the first contact portion 42, the second contact portion 43, and the plunger main body 41, the recessed portion being capable of accommodating the first protruding portion 222 and the second protruding portion 223.

Figure 6:
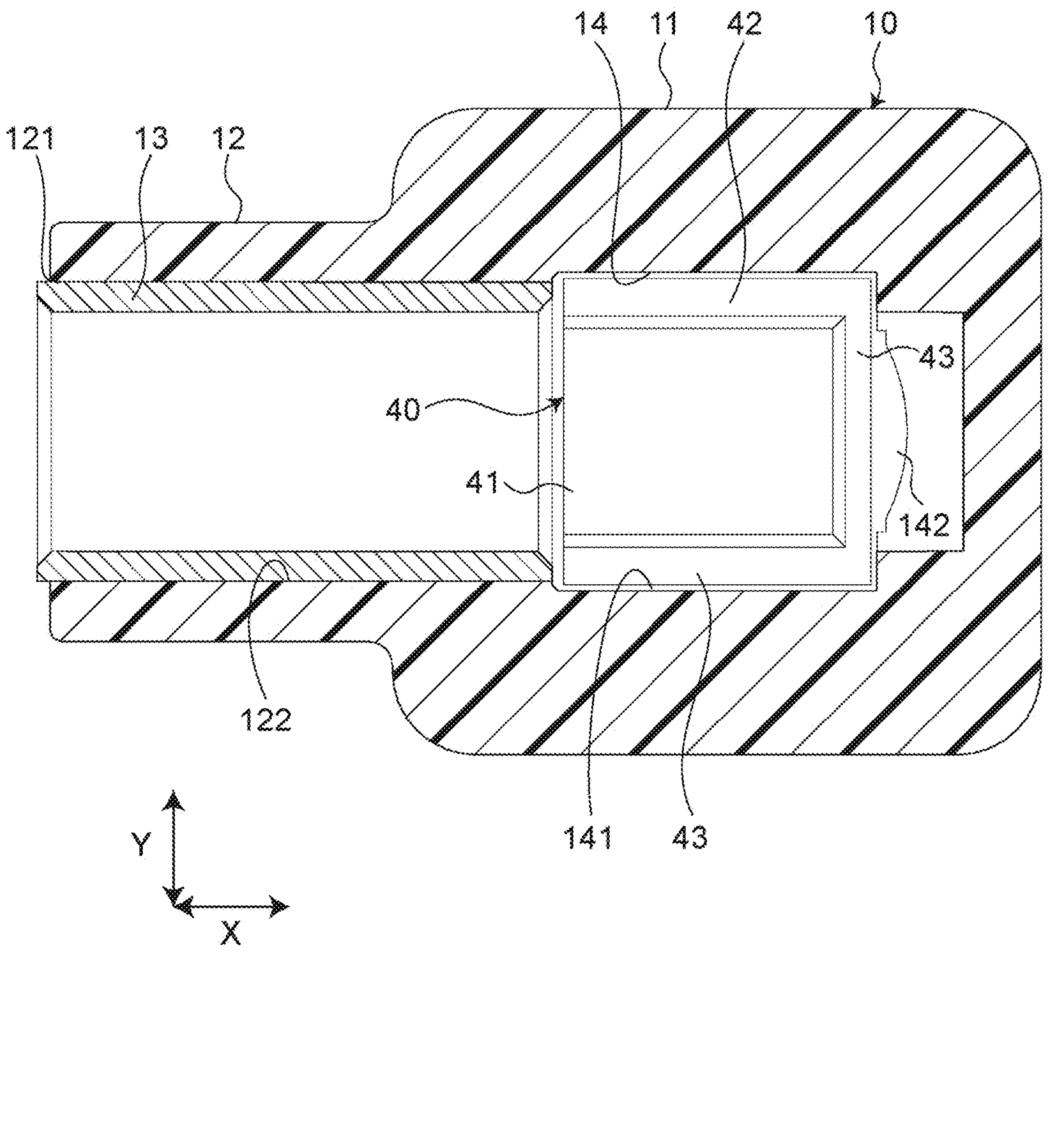
FIG. 6 is a cross-sectional view taken along line VI-VI of FIG. 2.

As illustrated in FIG. 6, movement of the plunger 40 in the first direction X and the third direction Y is restricted by an inner surface constituting the accommodating portion 14 of the housing 10. In other words, the housing 10 internally includes the accommodating portion 14 that accommodates the plunger 40 while positioning the plunger 40 in the direction intersecting the second direction Z.

Specifically, a portion 141 of the accommodating portion 14 that houses the plunger 40 has substantially the same rectangular shape as an outer shape of the plunger 40 as viewed along the second direction Z. A recessed portion 142 recessed in the direction away from the peripheral wall portion 12 is provided on an inner surface of the portion 141 far from the peripheral wall portion 12 in the first direction X. The recessed portion 142 facilitates detachment of the plunger 40 accommodated in the accommodating portion 14 from the accommodating portion 14.

As illustrated in FIG. 1, the operation lever 50 is disposed outside the housing main body 11 and extends in a direction intersecting (for example, orthogonal to) the shaft portion 20. The operation lever 50 is configured that one end of the operation lever 50 in a direction in which the operation lever 50 extends is connected to the shaft portion 20 and to be rotatable together with the shaft portion 20.

The plunger 40 is configured to be able to set the operation mode from either the one-side operation or the both-side operation.

In FIG. 4, the plunger 40 is disposed such that the third contact portion 44 faces the second notch 225 and the first protruding portion 222 in the second direction Z, and the non-contact portion 45 faces the first notch 224 and the second protruding portion 223 in the second direction Z. In this case, when the shaft main body 21 is rotated forward from the return position P1 toward the first operation position P2 (that is, in the direction of arrow A), the first protruding portion 222 comes into contact with the third contact portion 44 to move the plunger 40 in the second direction Z and in the direction approaching the switch main body 2 (hereinafter, it is referred to as an operation direction), so that the switch main body 2 is switched from off to on. When the shaft main body 21 is rotated backward from the return position P1 toward the second operation position P3 (that is, in the direction of arrow B), the third contact portion 44 is accommodated in the second notch 225, and the second protruding portion 223 is accommodated in the non-contact portion 45. That is, even if the shaft main body 21 is rotated backward, the plunger 40 does not move in the operation direction, and the switch main body 2 is not switched to on while being turned off.

Figure 7:
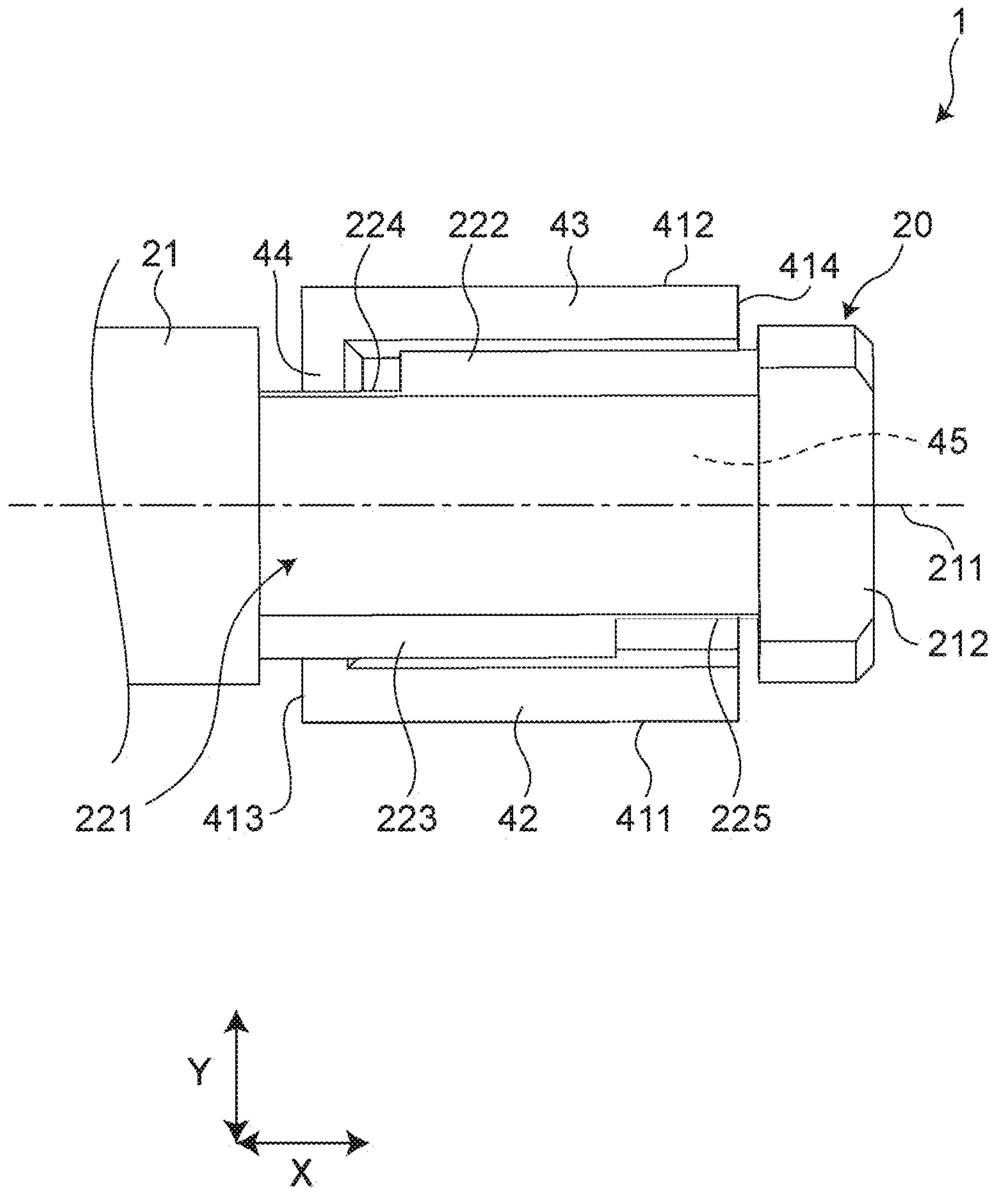
FIG. 7 is a plan view of the limit switch of FIG. 1 when an operation mode is set to one-side operation.

The limit switch 1 in which the plunger 40 illustrated in FIG. 4 is rotated by 180 degrees around the second direction Z is illustrated in FIG. 7. In FIG. 7, the plunger 40 is disposed such that the third contact portion 44 faces the first notch 224 and the second protruding portion 223 in the second direction Z, and the non-contact portion 45 faces the second notch 225 and the first protruding portion 222 in the second direction Z. In this case, when the shaft main body 21 is rotated forward in the direction of arrow A, the third contact portion 44 is accommodated in the first notch 224, and the first protruding portion 222 is accommodated in the non-contact portion 45. That is, even if the shaft main body 21 is rotated forward, the plunger 40 does not move in the operation direction, and the switch main body 2 is not switched to on while being turned off. When the shaft main body 21 is rotated backward in the direction of arrow B, the second protruding portion 223 comes into contact with the third contact portion 44 to move the plunger 40 in the operation direction, and the switch main body 2 is switched from off to on.

That is, in a state where the plunger 40 is disposed as described below, the operation mode of the limit switch 1 is set to the one-side operation.

- The plunger 40 is disposed such that the third contact portion 44 faces the first notch 224 and the second protruding portion 223 in the second direction Z, and the non-contact portion 45 faces the second notch 225 and the first protruding portion 222 in the second direction Z.
- The plunger 40 is disposed such that the third contact portion 44 faces the second notch 225 and the first protruding portion 222 in the second direction Z, and the non-contact portion 45 faces the first notch 224 and the second protruding portion 223 in the second direction Z.

Figure 8:
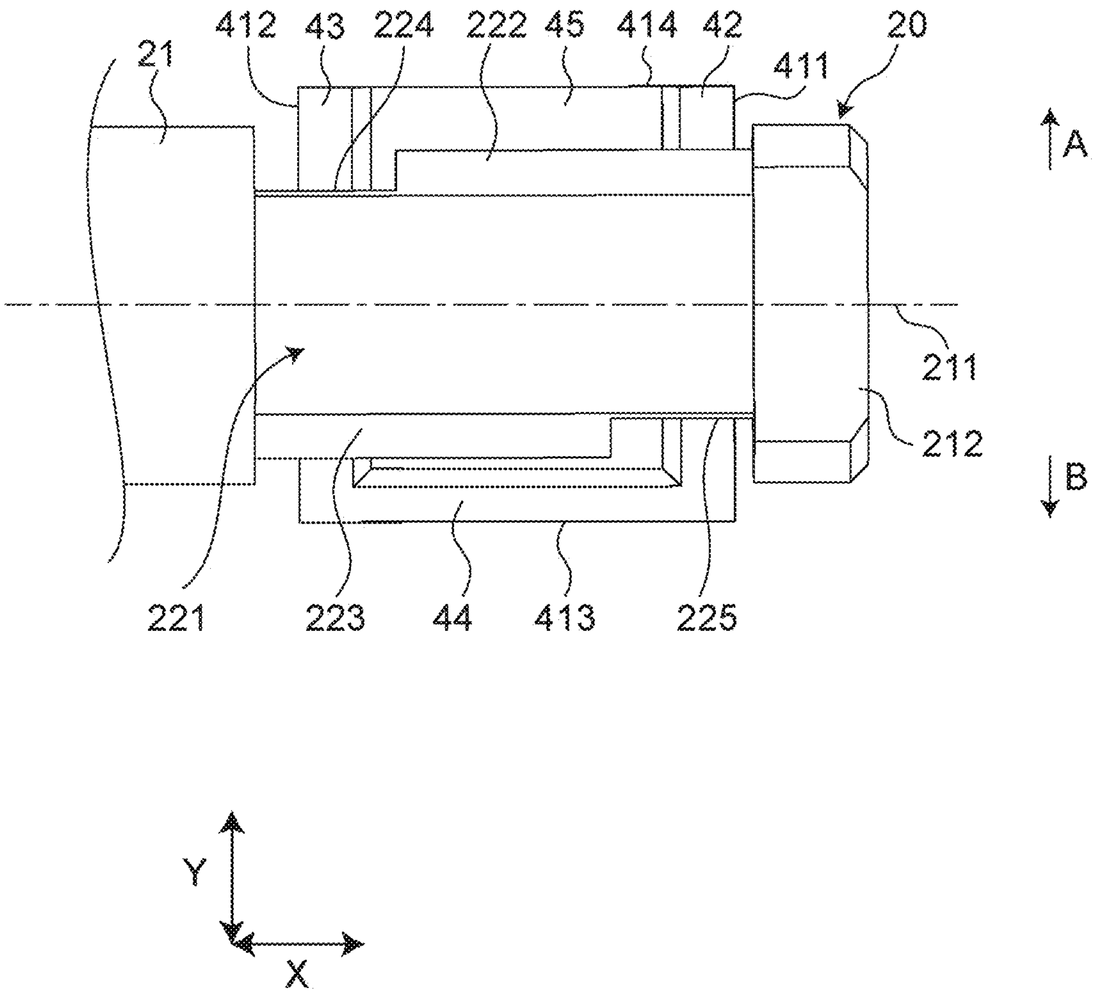
FIG. 8 is a plan view of the limit switch of FIG. 1 when the operation mode is set to both-side operation.

The limit switch 1 in which the plunger 40 illustrated in FIG. 4 is rotated by 90 degrees around the second direction Z is illustrated in FIG. 8. In FIG. 8, the plunger 40 is disposed such that the second contact portion 43 faces the first notch 224 and the second protruding portion 223 in the second direction Z, and the first contact portion 42 faces the second notch 225 and the first protruding portion 222 in the second direction Z. In this case, when the shaft main body 21 is rotated forward in the direction of arrow A, the first protruding portion 222 comes into contact with the first contact portion 42 to move the plunger 40 in the operation direction, and the switch main body 2 is switched from off to on. When the shaft main body 21 is rotated backward in the direction of arrow B, the second protruding portion 223 comes into contact with the second contact portion 43 to move the plunger 40 in the operation direction, and the switch main body 2 is switched from off to on.

That is, in a state where the plunger 40 is disposed as described below, the operation mode of the limit switch 1 is set to the both-side operation.

- The plunger 40 is disposed such that the first contact portion 42 faces the second notch 225 and the first protruding portion 222 in the second direction Z, and the second contact portion 43 faces the first notch 224 and the second protruding portion 223 in the second direction Z.
- The plunger 40 is disposed such that the first contact portion 42 faces the first notch 224 and the second protruding portion 223 in the second direction Z, and the second contact portion 43 faces the second notch 225 and the first protruding portion 222 in the second direction Z.

The limit switch 1 of the present embodiment can exhibit the following advantageous effects.

In the limit switch 1, the plunger 40 includes the plunger main body 41, the first contact portion 42 configured to be able to be accommodated in the first notch 224 and to come into contact with the first protruding portion 222 at the first operation position P2, the second contact portion 43 configured to be able to be accommodated in the second notch 225 and to come into contact with the second protruding portion 223 at the second operation position P3, the third contact portion 44 configured to be able to be accommodated in the first notch 224 or the second notch 225 and to come into contact with the first protruding portion 222 at the first operation position P2 or to come into contact with the second protruding portion 223 at the second operation position P3, and the non-contact portion 45 configured to be not in contact with the first protruding portion 222 or the second protruding portion 223. The first contact portion 42 and the second contact portion 43 are disposed so as to face each other in the facing direction, and the third contact portion 44 and the non-contact portion 45 are disposed so as to face each other in a direction different from the facing direction. With such a configuration, it is possible to realize the limit switch 1 in which the operation mode can be set from either one-side operation or both-side operation.

The housing 10 internally includes the accommodating portion 14 that accommodates the plunger 40 while positioning the plunger 40 in the direction intersecting the second direction. With such a configuration, the plunger 40 can be reliably opposed to the cam portion 22, so that the operation reliability of the limit switch 1 can be enhanced.

The non-contact portion 45 includes the recessed portion surrounded by the first contact portion 42, the second contact portion 43, and the plunger main body 41, the recessed portion being capable of accommodating the first protruding portion 222 and the second protruding portion 223. With such a configuration, it is possible to realize the limit switch 1 in which the operation mode can be set from either the one-side operation or the both-side operation with a simple configuration.

When viewed along the second direction, the plunger main body 41 has a quadrangular shape including the first side 411, the second side 412 facing the first side 411, the third side 413 intersecting the first side 411 and the second side 412, and the fourth side 414 facing the third side 413. The first contact portion 42 is disposed on the first side 411, the second contact portion 43 is disposed on the second side 412, the third contact portion 44 is disposed on the third side 413, and the non-contact portion 45 is disposed on the fourth side 414. With such a configuration, it is possible to realize the limit switch 1 in which the operation mode can be set from either the one-side operation or the both-side operation with a simple configuration.

The limit switch 1 can also be configured as follows.

In the above embodiment, when viewed from a direction from the peripheral wall portion 12 toward the housing main body 11 along the first direction X, the rotation in the direction opposite to the clockwise direction is defined as the forward rotation and the clockwise rotation is defined as the backward rotation, but the present invention is not limited thereto. When viewed from the direction from the peripheral wall portion 12 toward the housing main body 11 along the first direction X, the clockwise rotation may be defined as forward rotation, and the rotation in the opposite direction may be defined as backward rotation.

In the above embodiment, in FIG. 4, the protruding portion 222 provided on the upper side of the cam main body 221 in the third direction Y is defined as the first protruding portion, and the protruding portion 223 provided on the lower side of the cam main body 221 in the third direction Y is defined as the second protruding portion, but the present invention is not limited thereto. The protruding portion 223 provided on the lower side of the cam main body 221 in the third direction Y may be defined as the first protruding portion, and the protruding portion 222 provided on the upper side of the cam main body 221 in the third direction Y may be defined as the second protruding portion.

The switch main body 2 may adopt any configuration that can be switched on and off via the plunger 40 by the rotation of the shaft main body 21.

The operation unit 3 may be undetachably connected to the switch main body 2.

The peripheral wall portion 12 is not limited to being provided integrally with the housing main body 11 and may be provided separately. In this case, the peripheral wall portion 12 may be made of the same material as the housing main body 11 or may be made of a different material.

A shape and a configuration of each member constituting the limit switch 1 in the above embodiment are merely examples, and any other shape and any other configuration may be adopted.

For example, the plunger main body 41 is not limited to have a quadrangular shape when viewed along the second direction Z. The shape of the plunger main body 41 may be a polygonal shape or a circular shape when viewed along the second direction Z.

For example, the non-contact portion 45 is not limited to being configured to be surrounded by the first contact portion 42, the second contact portion 43, and the plunger main body 41. The non-contact portion 45 may adopt any configuration that does not contact the first protruding portion 222 or the second protruding portion 223 when the shaft main body 21 rotates.

Various embodiments of the present disclosure have been described above with reference to the drawings. Finally, various aspects of the present disclosure will be described. In the following description, as an example, reference numerals are also added.

A limit switch 1 of a first aspect of the present disclosure includes:

a switch main body 2 capable of being switched on and off; and an operation unit 3 connected to the switch main body 2, wherein the operation unit 3 includes:

a housing 10 having a box shape;

a shaft portion 20 including a shaft main body 21 and a cam portion 22, the shaft main body 21 extending from an outside of the housing 10 to an inside of the housing 10 along a first direction and being supported by the housing 10 in a state of being rotatable forward from a return position toward a first operation position around a rotation axis 211 extending in the first direction and being rotatable backward from the return position toward a second operation position opposite to the first operation position with respect to the return position, the cam portion 22 being provided in the shaft main body 21 located inside the housing 10 and being configured to rotate forward and backward together with the shaft main body 21;

a biasing portion 30 that is disposed inside the housing 10 and biases the cam portion 22 in a second direction intersecting the first direction and, in a direction, approaching the switch main body 2 to return the shaft main body 21 to the return position; and a plunger 40 that is disposed between the switch main body 2 and the cam portion 22 in the second direction inside the housing 10 and is disposed so as to face the cam portion 22, is configured to move in the second direction by rotation of the cam portion 22 to switch on and off of the switch main body 2, and is configured to be able to set an operation mode from either one-side operation in which the cam portion 22 is in contact at the first operation position but the cam portion 22 is not in contact at the second operation position, or the cam portion 22 is in contact at the second operation position but the cam portion 22 is not in contact at the first operation position, or both-side operation in which the cam portion 22 is in contact not only at the first operation position but also at the second operation position, the cam portion 22 includes:

a cam main body 221 in contact with the biasing portion;

a first protruding portion 222 that protrudes from one side in a third direction intersecting the first direction and the second direction of the cam main body 221 to a radial direction with respect to the rotation axis 211 and a direction away from the cam main body 221 when viewed along the second direction, and is configured to be able to come into contact with the plunger 40;

a second protruding portion 223 that protrudes from the other side in the third direction of the cam main body 221 to the radial direction and a direction away from the cam main body 221, and is configured to be able to come into contact with the plunger 40;

a first notch 224 provided at one end of the first protruding portion 222 in the first direction and extending toward the rotation axis 211 from an end of the first protruding portion 222 farther from the rotation axis 211 in the radial direction; and a second notch 225 provided at the other end of the second protruding portion 223 in the first direction and extending toward the rotation axis 211 from an end of the second protruding portion 223 farther from the rotation axis 211 in the radial direction, the plunger 40 includes:

a plunger main body 41 facing the cam portion 22 in the second direction;

a first contact portion 42 that protrudes from the plunger main body 41 toward the cam portion 22 along the second direction, and is configured to be able to be accommodated in the first notch 224 and to come into contact with the second protruding portion 223;

a second contact portion 43 that protrudes from the plunger main body 41 toward the cam portion 22 along the second direction, and is configured to be able to be accommodated in the second notch 225 and to come into contact with the first protruding portion 222;

a third contact portion 44 that protrudes from the plunger main body 41 toward the cam portion 22 along the second direction, and is configured to be able to be accommodated in the first notch 224 and to come into contact with the second protruding portion 223 or to be able to be accommodated in the second notch 225 and to come into contact with the first protruding portion 222; and a non-contact portion 45 configured to be not in contact with the first protruding portion 222 and the second protruding portion 223, the first contact portion 42 and the second contact portion 43 are disposed so as to face each other in a facing direction intersecting the second direction, and the third contact portion 44 and the non-contact portion 45 are disposed so as to face each other in a direction intersecting the second direction and, in a direction, different from the facing direction, in a state where the plunger 40 is disposed such that the first contact portion 42 faces the second notch 225 and the first protruding portion 222, and the second contact portion 43 faces the first notch 224 and the second protruding portion 223 in the second direction, an operation mode is set to the both-side operation, and in a state where the plunger 40 is disposed such that the third contact portion 44 faces the first notch 224 and the second protruding portion 223, and the non-contact portion 45 faces the second notch 225 and the first protruding portion 222, or such that the third contact portion 44 faces the second notch 225 and the first protruding portion 222 and the non-contact portion 45 faces the first notch 224 and the second protruding portion 223 in the second direction, the operation mode is set to the one-side operation.

In the limit switch 1 according to a second aspect of the present disclosure, the housing 10 internally includes an accommodating portion 14 that accommodates the plunger 40 while positioning the plunger 40 in a direction intersecting the second direction.

In the limit switch 1 according to a third aspect of the present disclosure, the non-contact portion 45 includes a recessed portion surrounded by the first contact portion 42, the second contact portion 43 and the plunger main body 41, the recessed portion being capable of accommodating the first protruding portion 222 and the second protruding portion 223.

In the limit switch 1 according to a fourth aspect of the present disclosure, the plunger main body 41 has a polygonal shape when viewed along the second direction.

In the limit switch 1 according to a fifth aspect of the present disclosure, the plunger main body 41 has a quadrangular shape including a first side 411, a second side 412 facing the first side 411, a third side 413 intersecting the first side 411 and the second side 412, and a fourth side 414 facing the third side 413 when viewed along the second direction, and the first contact portion 42 is disposed on the first side 411, the second contact portion 43 is disposed on the second side 412, the third contact portion 44 is disposed on the third side 413, and the non-contact portion 45 is disposed on the fourth side 414.

By appropriately combining any embodiments or modifications among the various embodiments or modifications, the effects of the respective embodiments or modifications can be achieved. In addition, combinations of embodiments, combinations of examples, or combinations of embodiments and examples are possible, and combinations of features in different embodiments or examples are also possible.

Although the present disclosure has been fully described in connection with preferred embodiments with reference to the accompanying drawings, various modifications and corrections will be apparent to those skilled in the art. Such modifications and corrections are to be understood as being included within the scope of the present disclosure as set forth in the appended claims.

INDUSTRIAL APPLICABILITY

The limit switch of the present disclosure can be applied to, for example, an assembly line of an automobile or the like.

REFERENCE SIGNS LIST

1 limit switch
2 switch main body
3 operation unit
10 housing
11 housing main body
12 peripheral wall portion
13 bearing
14 accommodating portion
141 portion
142 recessed portion
15 recessed portion
20 shaft portion
21 shaft main body
211 rotation axis
212 end portion
22 cam portion
221 cam main body
222 first protruding portion
223 second protruding portion
224 first notch
225 second notch
226 contact surface
30 biasing portion
31 coil spring
32 return plunger
321 transmission plate portion
322 guide plate portion
40 plunger
41 plunger main body
411 first side
412 second side
413 third side
414 fourth side
42 first contact portion
421 inclined surface
43 second contact portion
431 inclined surface
44 third contact portion
441 inclined surface
45 non-contact portion
50 operation lever

The invention claimed is:

1. A limit switch, comprising:

a switch main body capable of being switched on and off; and an operation unit connected to the switch main body, wherein the operation unit includes:

a housing having a box shape;

a shaft portion including a shaft main body and a cam portion, the shaft main body extending from an outside of the housing to an inside of the housing along a first direction and being supported by the housing in a state of being rotatable forward from a return position toward a first operation position around a rotation axis extending in the first direction and being rotatable backward from the return position toward a second operation position opposite to the first operation position with respect to the return position, the cam portion being provided in the shaft main body located inside the housing and being configured to rotate forward and backward together with the shaft main body;

a biasing portion that is disposed inside the housing and biases the cam portion in a second direction intersecting the first direction and in a direction approaching the switch main body to return the shaft main body to the return position; and a plunger that is disposed between the switch main body and the cam portion in the second direction inside the housing and is disposed so as to face the cam portion, is configured to move in the second direction by rotation of the cam portion to switch on and off of the switch main body, and is configured to be able to set an operation mode from either one-side operation in which the cam portion is in contact at the first operation position but the cam portion is not in contact at the second operation position, or the cam portion is in contact at the second operation position but the cam portion is not in contact at the first operation position, or both-side operation in which the cam portion is in contact not only at the first operation position but also at the second operation position, the cam portion includes:

a cam main body in contact with the biasing portion;

a first protruding portion that protrudes from one side in a third direction intersecting the first direction and the second direction of the cam main body to a radial direction with respect to the rotation axis and a direction away from the cam main body when viewed along the second direction, and is configured to be able to come into contact with the plunger;

a second protruding portion that protrudes from the other side in the third direction of the cam main body to the radial direction and a direction away from the cam main body, and is configured to be able to come into contact with the plunger;

a first notch provided at one end of the first protruding portion in the first direction and extending toward the rotation axis from an end of the first protruding portion farther from the rotation axis in the radial direction; and a second notch provided at the other end of the second protruding portion in the first direction and extending toward the rotation axis from an end of the second protruding portion farther from the rotation axis in the radial direction, the plunger includes:

a plunger main body facing the cam portion in the second direction;

a first contact portion that protrudes from the plunger main body toward the cam portion along the second direction, and is configured to be able to be accommodated in the first notch and to come into contact with the second protruding portion;

a second contact portion that protrudes from the plunger main body toward the cam portion along the second direction, and is configured to be able to be accommodated in the second notch and to come into contact with the first protruding portion;

a third contact portion that protrudes from the plunger main body toward the cam portion along the second direction, and is configured to be able to be accommodated in the first notch and to come into contact with the second protruding portion or to be able to be accommodated in the second notch and to come into contact with the first protruding portion; and a non-contact portion configured to be not in contact with the first protruding portion and the second protruding portion, the first contact portion and the second contact portion are disposed so as to face each other in a facing direction intersecting the second direction, and the third contact portion and the non-contact portion are disposed so as to face each other in a direction intersecting the second direction and in a direction different from the facing direction, in a state where the plunger is disposed such that the first contact portion faces the second notch and the first protruding portion, and the second contact portion faces the first notch and the second protruding portion in the second direction, an operation mode is set to the both-side operation, and in a state where the plunger is disposed such that the third contact portion faces the first notch and the second protruding portion, and the non-contact portion faces the second notch and the first protruding portion, or such that the third contact portion faces the second notch and the first protruding portion and the non-contact portion faces the first notch and the second protruding portion in the second direction, the operation mode is set to the one-side operation.

2. The limit switch according to claim 1, wherein the housing internally includes an accommodating portion that accommodates the plunger while positioning the plunger in a direction intersecting the second direction.

3. The limit switch according to claim 1, wherein the non-contact portion includes a recessed portion surrounded by the first contact portion, the second contact portion and the plunger main body, the recessed portion being capable of accommodating the first protruding portion and the second protruding portion.

4. The limit switch according to claim 1, wherein the plunger main body has a polygonal shape when viewed along the second direction.

5. The limit switch according to claim 4, wherein, the plunger main body has a quadrangular shape including a first side, a second side facing the first side, a third side intersecting the first side and the second side, and a fourth side facing the third side when viewed along the second direction, and the first contact portion is disposed on the first side, the second contact portion is disposed on the second side, the third contact portion is disposed on the third side, and the non-contact portion is disposed on the fourth side.

6. The limit switch according to claim 2, wherein the non-contact portion includes a recessed portion surrounded by the first contact portion, the second contact portion and the plunger main body, the recessed portion being capable of accommodating the first protruding portion and the second protruding portion.

7. The limit switch according to claim 2, wherein the plunger main body has a polygonal shape when viewed along the second direction.

8. The limit switch according to claim 7, wherein, the plunger main body has a quadrangular shape including a first side, a second side facing the first side, a third side intersecting the first side and the second side, and a fourth side facing the third side when viewed along the second direction, and the first contact portion is disposed on the first side, the second contact portion is disposed on the second side, the third contact portion is disposed on the third side, and the non-contact portion is disposed on the fourth side.

9. The limit switch according to claim 3, wherein the plunger main body has a polygonal shape when viewed along the second direction.

10. The limit switch according to claim 9, wherein, the plunger main body has a quadrangular shape including a first side, a second side facing the first side, a third side intersecting the first side and the second side, and a fourth side facing the third side when viewed along the second direction, and the first contact portion is disposed on the first side, the second contact portion is disposed on the second side, the third contact portion is disposed on the third side, and the non-contact portion is disposed on the fourth side.

11. The limit switch according to claim 6, wherein the plunger main body has a polygonal shape when viewed along the second direction.

12. The limit switch according to claim 11, wherein, the plunger main body has a quadrangular shape including a first side, a second side facing the first side, a third side intersecting the first side and the second side, and a fourth side facing the third side when viewed along the second direction, and the first contact portion is disposed on the first side, the second contact portion is disposed on the second side, the third contact portion is disposed on the third side, and the non-contact portion is disposed on the fourth side.

* * * * *